(12) United States Patent
Strumolo et al.

(10) Patent No.: US 6,996,509 B2
(45) Date of Patent: Feb. 7, 2006

(54) PAINT SPRAY PARTICLE TRAJECTORY ANALYSIS METHOD AND SYSTEM

(75) Inventors: Gary S. Strumolo, Beverly Hills, MI (US); Ronald H. Miller, Saline, MI (US); Viswanathan Babu, Madras (IN)

(73) Assignee: Ford Global Technologies, LLC, Dearborn, MI (US)

( * ) Notice: Subject to any disclaimer, the term of this patent is extended or adjusted under 35 U.S.C. 154(b) by 572 days.

(21) Appl. No.: 09/432,485

(22) Filed: Nov. 1, 1999

(65) Prior Publication Data

US 2003/0097242 A1 May 22, 2003

Related U.S. Application Data

(63) Continuation-in-part of application No. 09/175,091, filed on Oct. 19, 1998, now Pat. No. 6,263,300.

(51) Int. Cl.
G08G 7/48 (2006.01)

(52) U.S. Cl. ............... 703/6; 703/2; 703/8; 703/9
(58) Field of Classification Search ............ 703/2, 703/6, 8–9
See application file for complete search history.

(56) References Cited

U.S. PATENT DOCUMENTS

| 4,965,741 A | 10/1990 | Winchell et al. | |
|---|---|---|---|
| 5,023,800 A | 6/1991 | Carver et al. | |
| 5,568,404 A * | 10/1996 | Strumolo | 702/140 |
| 6,263,300 B1 * | 7/2001 | Strumolo et al. | 703/8 |

FOREIGN PATENT DOCUMENTS

| EP | 0 415 168 A2 | 3/1991 |
|---|---|---|
| EP | 0 561 564 A2 | 3/1992 |
| EP | 0 529 130 A1 | 3/1993 |

OTHER PUBLICATIONS

Ma et al.; "Virtual Smoke: an Interactive 3D Flow Visualization Technique"; IEEE Proc. Visualization; pp. 46-53; Oct. 1992.*
Bryson et al.; "The Virtual Wind Tunnel"; IEEE Comp. Graphics & Appl.; pp. 25-34; Jul. 1992.*
Kinema/Sim Manuel—Chapters 1-15; ArSciMed—1996.*
No. 982291, "Transient CFD Simultations of a Bill Sprayer", R. Miller, G. Strumolo, V. Babu, J. Braslaw, and M. Mehta, Ford Motor Company, Dearborn, MI Copyright 1998 Society of Automotive Engineers, Inc.
"Physics and the Ear", Physics World, Aug. 1997, vol. 10, No. 8 pp. 45-49.

* cited by examiner

Primary Examiner—Hugh Jones
(74) Attorney, Agent, or Firm—David B. Kelley; Daniel H. Bliss

(57) ABSTRACT

A system and method of analyzing paint spray particle trajectory on a vehicle with a computer aided design (CAD) model representative of the vehicle. The method includes the steps of preparing a CAD model of a desired portion of the vehicle and placing a paint spray gun at a desired location with respect to the desired portion of the vehicle. The method also includes the steps of specifying a set of particle information describing particles to be sprayed from the paint spray gun and computing a trajectory for a particle stream emanating from the paint spray gun. The method further includes the steps of displaying the trajectory relative to the desired portion of the vehicle on a display to permit visual observation thereof and relocating the paint spray gun if necessary to achieve a desired trajectory.

6 Claims, 8 Drawing Sheets

FIG 3
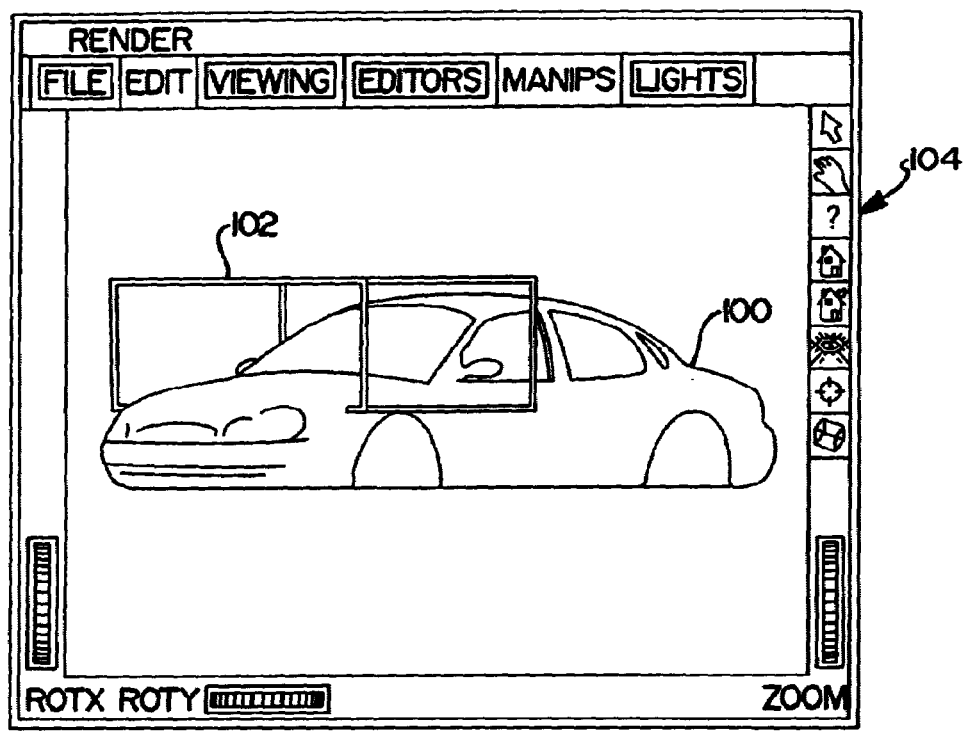
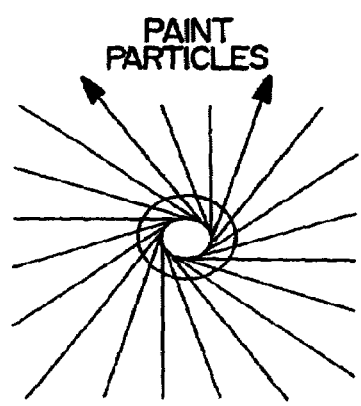
FIG 8A
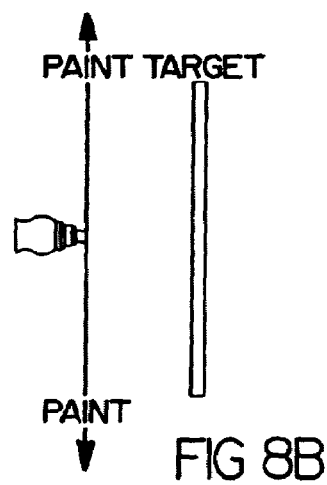
FIG 8B

Q/M=5
30000 RPM
VS=30 M/S

QM=5
30000 RPM
VS=10 M/S

Q/M=5
10000 RPM
VS=30M/S

QM=5
10000 RPM
VS=10M/S

Q/M=5
50000 RPM
VS=30M/S

QM=5
50000 RPM
VS=10M/S

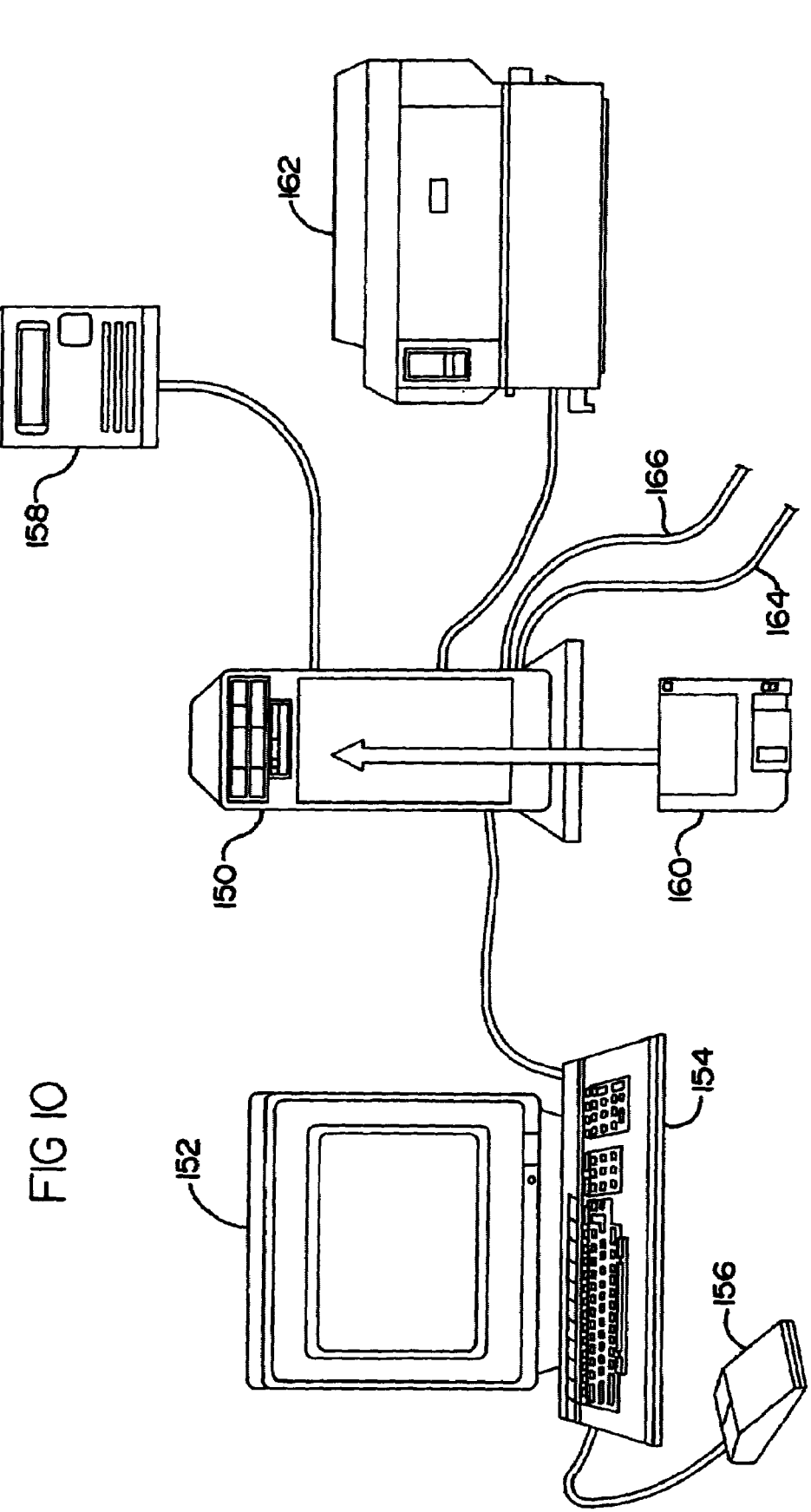

PAINT SPRAY PARTICLE TRAJECTORY ANALYSIS METHOD AND SYSTEM

The present application is a continuation-in-part of application Ser. No. 09/175,091, filed Oct. 19, 1998, now U.S. Pat. No. 6,263,300.

BACKGROUND OF THE INVENTION

1. Field of the Invention

The present invention relates generally to computer aided vehicle design and, more specifically, to a method and system of paint spray particle trajectory analysis for computer aided vehicle design.

2. Description of the Related Art

There are numerous computer related tools which can facilitate the design and testing of vehicles such as motor vehicles, including generalized software programs such as computer aided engineering (CAE), computer aided design (CAD), and computational fluid dynamics (CFD). These tools are typically used to investigate many issues related to vehicle design, including vehicle durability, vehicle performance, and vehicle aerodynamics. Heretofore, limitations on computer speed and algorithm accuracy have inhibited the development of a particle trajectory analysis tool in which several exterior aerodynamic design issues can be studied.

Paint application operations amount to a significant fraction of the total manufacturing cost of new vehicles. Improvements in the painting process can wsnot only reduce the manufacturing cost but improve appearance and durability, which directly influences customer satisfaction, and warranty costs. One metric for improvements in the painting process is the Paint Transfer Efficiency (PTE) which is a measure of how well paint is transferred from a bell applicator of a paint spray gun to a body of the vehicle. Increases in PTE effect paint quality and costs while simultaneously reducing paint waste and emissions. With demands to reduce vehicle costs and emissions, new technologies are being developed to determine bell applicator and paintbooth designs. Computation Fluid Dynamics (CFD) is one technology that can aid in quickly determining PTEs under various operating conditions (e.g. shaping air velocity, bell angular velocity and fluid flow, and paintbooth downdraft velocity).

With the advent of new and improved CFD technology, an accurate external flow field can now be calculated, thus making a particle trajectory analysis tool technically possible. As a result, it is desirable to provide a system and method for paint spray trajectory analysis to aid in vehicle design. It is also desirable to have a process to improve paint transfer efficiency for bell sprayers of paint spray guns. It is further desirable to provide a process that will determine particle trajectories of paint particles under the influence of drag, gravity and electrostatic potential.

SUMMARY OF THE INVENTION

Accordingly, the present invention is a system and method of analyzing paint spray particle trajectory on a vehicle with a computer aided design (CAD) model representative of the vehicle. The method includes the steps of preparing a CAD model of a desired portion of the vehicle and placing a paint spray gun at a desired location with respect to the desired portion of the vehicle. The method also includes the steps of specifying a set of particle information describing particles to be sprayed from the paint spray gun and computing a trajectory for a particle stream emanating from the paint spray gun. The method further includes the steps of displaying the trajectory relative to the desired portion of the vehicle on a display to permit visual observation thereof and relocating the paint spray gun if necessary to achieve a desired trajectory.

One advantage of the present invention is that a method and system of analyzing paint spray particle trajectory is provided which permits modification of vehicle design based upon computed particle trajectories with respect to a CAD model of the vehicle. Another advantage of the present invention is that the method and system enables dynamic placement of a paint spray gun into a flow domain to permit visual observation and alteration of resulting paint particle trajectories with respect to a CAD model representative of the vehicle. Yet another advantage of the present invention is that the method and system allows a user to specify various characteristics of a paint spray gun including visually placing it near the vehicle, prescribing droplet size and density, spray angle and velocity, and then computing and displaying spray trajectories. Still another advantage of the present invention is that the method and system determines paint particle trajectories under the influence of drag, gravity and electrostatic potential.

Other features and advantages of the present invention will be readily appreciated as the same becomes better understood after reading the subsequent description taken in conjunction with the accompanying drawings.

BRIEF DESCRIPTION OF THE DRAWINGS

FIG. 3 is a screen perspective view of a CAD model of a portion of a vehicle.

FIGS. 8A and 8B show a representative sample of particle trajectories.

FIG. 10 is a perspective view of a system, according to the present invention, of analyzing paint spray particle trajectory.

DESCRIPTION OF THE PREFERRED EMBODIMENT(S)

Figure 1:
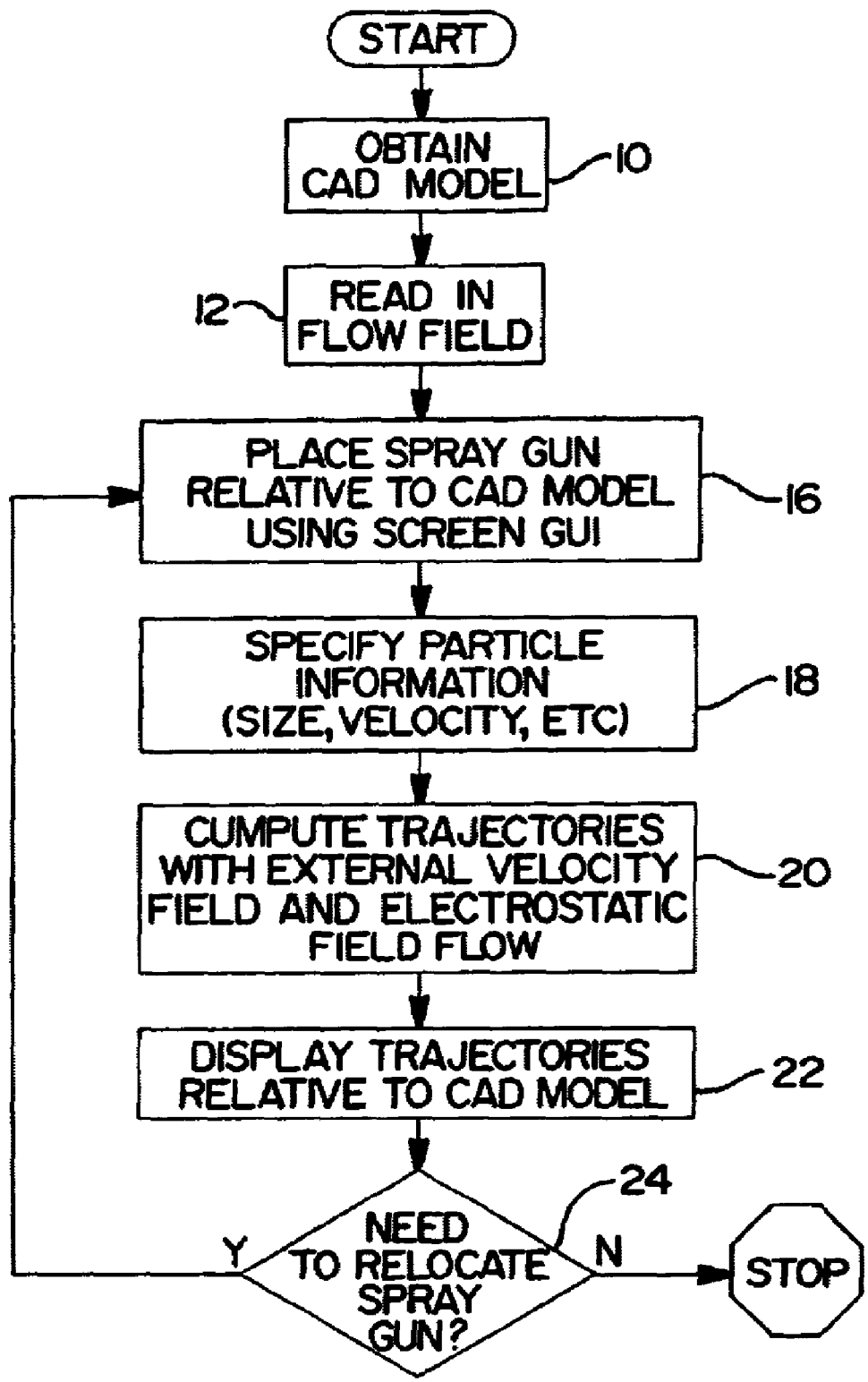
FIG. 1 is a flowchart of a method, according to the present invention, of analyzing paint spray trajectory.

Referring to the drawings and in particular FIG. 1, one embodiment of a method, according to the present invention, of analyzing paint spray particle trajectories relative to a computer aided design (CAD) model representative of a portion of a vehicle with an external flow thereover is shown. The method is intended to be carried out on a computer system which includes a computer having a memory, a processor, a display and user input mechanism, such as a mouse or keyboard, as subsequently described. In the present invention, the method starts in box 10 with a CAD model of a vehicle, or a desired portion of a vehicle, which is obtained from an electronic storage device, such as a computer file stored on a server memory, the memory of the computer, a magnetic disk storage device, or any one of numerous other electronic or magnetic storage devices. The CAD model is preferably displayed, as is known in the art, on the display, which can be, for example, a video display screen.

Next, in box 12, a predetermined flow field over the CAD model, for example, representative of vehicle aerodynamics due to movement through the ambient is read in from an external source, for example, a stored file. The external flow field may be computed by various commercial software programs, for example, PowerFlow™. This external flow field is computed relative to the exterior surface of the CAD model obtained in box 10.

Figure 5:
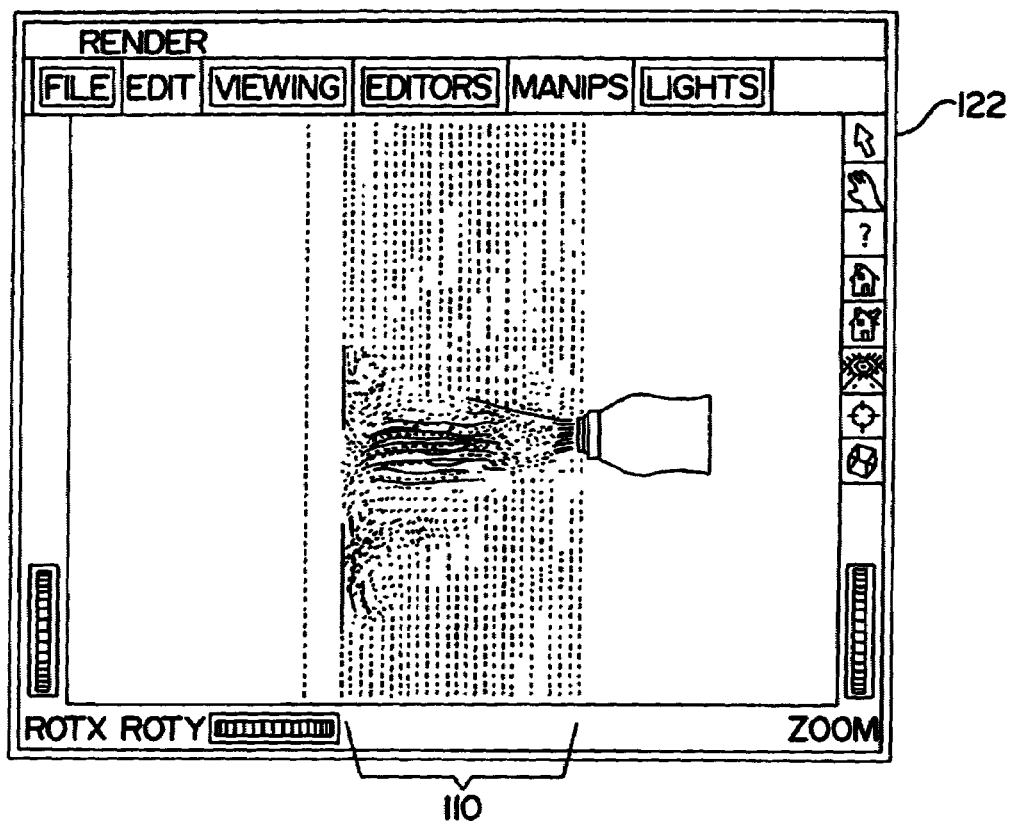
FIG. 5 is a screen view showing velocity vectors along a vertical slice of a flow field over a portion of the CAD model.
Figure 6:
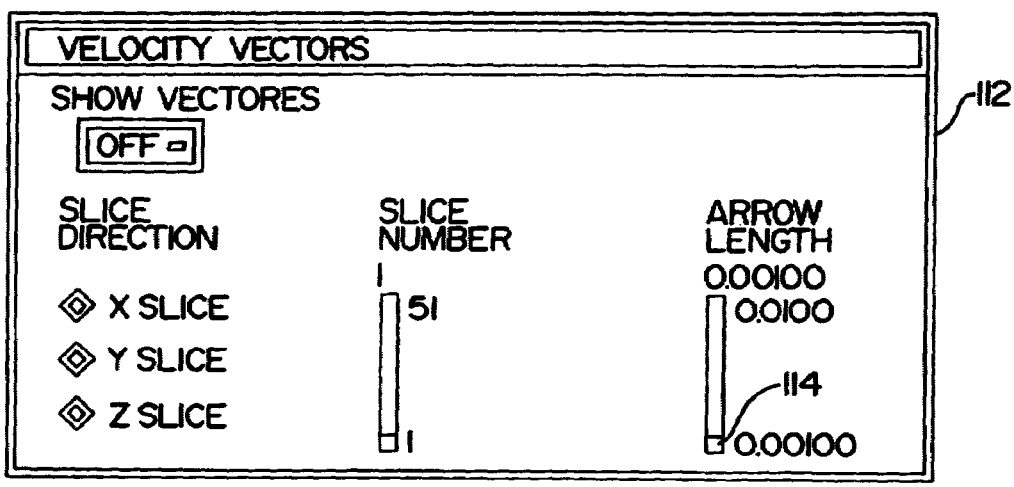
FIG. 6 is a screen view showing velocity vector selection for the present invention.

Next, the method advances to block 16 where a simulated paint spray gun is placed relative to the CAD model. The paint spray gun is of an electrostatic type having a bell cup and housing, as well as a shaping air ring (FIG. 5). The paint spray gun is preferably located using an on-screen graphical user interface (GUI), in cooperation with the user input mechanism, preferably a mouse device as is known in the art. The screen GUI and mouse device permit a user to easily and dynamically place the paint spray gun at a desired location relative to the CAD model. It should be appreciated that more than one paint spray gun may be located relative to the CAD model and that particle trajectories emanating therefrom may be calculated and simultaneously displayed, described subsequently.

The method then advances to block 18 and information is specified about the particles which are simulated to be sprayed from the paint spray gun. This information may include, for example, particle size, particle velocity exiting the paint spray gun, particle density and other information describing particle characteristics. It should be appreciated that the particle information of box 18 need not be input in the order shown in FIG. 1, but may be provided at any step of the method prior to computation of particle trajectories in box 20. In box 20, the trajectories are computed according to known physical principles as further described below, and are computed with an external velocity field flow and electrostatic field flow.

After the particle trajectories have been computed, they are displayed relative to the CAD model in box 22. Various options for display of the particle trajectories may be chosen, as further described below, and an on-screen GUI may be used to ease user selection from among the display options.

Finally, in diamond 24, the user is given an option to dynamically relocate the paint spray gun, preferably using the screen GUI, in order to assess the performance of a new vehicle design, or to compare alternate vehicle designs, or to compare results from physical aerodynamic tests and a particular vehicle design.

In the present invention, the trajectories of the paint spray particles of a given diameter and given initial velocity can be predicted as in box 20 of FIG. 1 as they move through a three-dimensional (3D) flow field under the influence of aerodynamic drag, gravity and electrostatic potential. An equation governing the trajectory of a particle mass m and charge q, in a flow field ($V_{air}$) and in the presence of gravity (g) and an electric field (E) is given by $$m\frac{d^2\vec{x}}{dt^2} = q\vec{E} + m\vec{g} - 0.5\rho A C_d \left|\frac{d\vec{x}}{dt} - \vec{V}_{air}\right|\left(\frac{d\vec{x}}{dt} - \vec{V}_{air}\right) \quad (1)$$

where $\rho$ is the air density, A is the cross-sectional area of a particle which preferably is modeled as a sphere, and $C_d$ is the coefficient of drag. The details of the breakup of the paint into droplets and surface tension effects are not included in the equation (1) as negligible, but those skilled in the art will understand that such may be included if desired. If these particles are assumed to be spherical droplets with mass density $\rho_{liquid}$ and diameter d, we can rewrite the above equation as follows:

$$\frac{d^2\vec{x}}{dt^2} = \frac{q}{m}\vec{E} + \vec{g} - L\left(\frac{d\vec{x}}{dt} - \vec{V}_{air}\right) \text{ where} \quad (2)$$

$$L = \frac{3}{4}C_d\left|\frac{d\vec{x}}{dt} - \vec{V}_{air}\right|\frac{1}{\rho_{liquid}d} \quad (3)$$

The coefficient of drag varies depending on the relative velocity of the droplet with respect to the flow field velocity vector, V. The relative velocity is simply the vector $$\vec{V}_{rel} = \frac{d\vec{x}}{dt} - \vec{V}_{air} \quad (4)$$

Accurate experimental data on the drag coefficient of spheres for a wide range of Reynolds numbers is known, and preferably a lookup table from these experimental values is constructed and the method and system of the present invention calculates the drag coefficient at each timestep from this table, with the Reynolds number based on the relative velocity. Given an initial location in the flow field and a velocity of the paint particles, equation (2) can be solved, preferably using a 4th order Runge-Kutta scheme, to obtain a particle trajectory. The initial location is specified in box 16 of FIG. 1 by locating the paint spray gun, and the initial velocity in box 18. Other trajectory computations can be used to obtain the particle trajectories of the present invention.

As to the effects on paint transfer efficiency (PTE) (q/m, voltage and bell speed effects), the influence of the charge-to-mass ratio, q/m, on a particle trajectory can be seen in Eq. (1), where the acceleration experienced by particle is given by $$\frac{q}{m}\vec{E} = \frac{q}{m}\vec{\nabla}V \quad (5)$$

which depends not only on the charge-to-mass ratio but also on the gradient of the electric potential V. Subsequently, the larger the q/m ratio the larger the electrostatic force, resulting in an increase in PTE. Self-consistent fields are neglected and, therefore, the electrostatic repulsion for larger q/m is not seen and does not modify the PTE. A linear potential is assumed given by $$V = V(x) = V_0 \left( \frac{x_{target} - x}{x_{target} - x_{bell}} \right) \quad (6)$$

where $x_{bell}$ is less than or equal to x, which is less than or equal to $x_{target}$, and $x_{target}-x_{bell}$ is the distance from the bell of the spray gun to the target (approximately 0.3 m). The potential at the bell, therefore, is $V_0$ (input quantity) and decreases linearly to zero at the target. The electric potential is assumed only to vary in the x-direction, which corresponds to the principle axis in the direction from the bell to the target. In practice, the electric potential is closer to exponential in nature, resulting in a larger and smaller electric field in the near and far field regions as compared to Eq. (6), respectively. The assumption of a potential field is necessitated due to the fact that the electrostatic fields are not solved in a self-consistent manner, i.e., solving Poisson's equation given a charge distribution. The initial velocity of the paint particles is given by the rotational speed of the bell cup of the paint spray gun. FIGS. 8A and 8B show a representative sample of particle trajectories. A particle's tangential velocity is given by $2\pi N\rho_{cup}$ wherein N is the rotational speed of the bell and $\rho_{cup}$ is the bell cup radius of the paint spray gun. For a 30000 rpm, the particles initial velocity is on the order of 80 m/s. For the most part, the particles leave the bell cup tangentially, as depicted in FIGS. 8A and 8B. However, due to the actual atomization, variations in the velocity are possible, resulting in a spread of velocities coming from the bell of the paint spray gun, as well as a slight velocity component in the axial direction. Table 1 contains the initial particle velocities for the range of bell speeds used, having an initial velocity of 26 m/s at 10000 rpm up to 80 m/s at 30000 rpm.

TABLE 4

Paint Particle Velocity

| Bell Speed [rpm] | Tangential Velocity [m/s] |
|---|---|
| 10000 | 26 |
| 20000 | 53 |
| 30000 | 80 |

As illustrated in FIGS. 9A through 9F, the sensitivity of bell and shaping air speed on transfer efficiency is shown. Here, the PTE is used in a qualitative manner, i.e., any change in bell operating conditions which increases the radius of the paint spray pattern decreases transfer efficiency with zero efficiency as having no particle impinge the target. FIGS. 9A, 9B and 9C have bell speeds of 30000, 10000, and 50000 rpm, respectively. The shaping air, charge-to-mass ratio, and particle diameter are 30 m/s, 5 $\mu$C/g, and 2 microns, respectively, and are held constant in FIGS. 9A though 9F. For low speeds, the electric force dominates the particle trajectories as shown in FIG. 9B. As the bell speed increases, the radius of trajectories, that intersect the target, increases as a result of larger initial particle velocities. At 50000 rpm, no particles impinge upon the target resulting in a zero transfer efficiency.

FIGS. 9D through 9F decrease the shaping air magnitude from 30 m/s to 10 m/s. These figures have been slightly rotated to view more of the 3-D nature of the graphical display created by the method. Even though the shaping air velocity has changed, the particle trajectories remain unchanged. The influence of the shaping air in the numerical simulation is less than that in actual experiments. Typically, 2 micron particles impinge the target with a small spray radius under the influence of only the shaping air. The numerical simulation requires an electrostatic field in order to transfer the paint particles to the target. The difference lies in the numerical source region of the shaping air being approximately 3 mm in width as determined from the CFD. With velocities on the order of 20 to 80 m/s, only small changes in the particle trajectories are possible over an effective collisional length of only 3 to 5 mm. It should be appreciated that a more sophisticate method for modeling the shaping may be desired due to the effect of orifice flow.

Referring to FIG. 2, a method, according to the present invention, for enabling dynamic placement of a paint spray gun relative to a CAD design model representative of a desired portion of a vehicle to permit visual observation of spray trajectories with respect to the CAD model with external flow thereover is shown. In box 30, a CAD model of a vehicle is obtained as described above, which is preferably rendered on a display screen such as that seen in FIG. 3. The CAD model (FIG. 3) may include the whole vehicle or a desired portion thereof. Next, in box 32 of FIG. 2, a flow field around the external surface of the CAD model is read in for the specified CAD model. The flow field is preferably pre-computed based upon information supplied by a user regarding the particular vehicle CAD model and other external conditions affecting an external flow therearound. Typically, flow field data external to the vehicle is computed by a CFD program, as described above, and such information is saved to a computer file for later use with the method and system of the present invention.

After reading in the flow field, a rectangular box 102 may appear in the render window (FIG. 3). The box 102 shows a region in which flow field data is available. If desired, a user can crop this box, as well as sub-sample in it, to select only a subset of the data for the paint spray gun application, for example, by using vertical sliders 106 in a cropping/sub-sampling window 108 (FIG. 4). Such allows a reduction of the computer memory requirements in a computer system and potentially enables the method and system to run faster. Additionally, a two-dimensional slice of the external flow field can be displayed, as indicated by vectors 110 in FIG. 5, by selecting such in a velocity vector's window 112 (FIG. 6). A slice direction can be chosen to be along any one of the coordinate axes by selecting the appropriate button (X slice, Y slice, Z slice) and the magnitude of the velocity vectors can be controlled through a vertical slider 114 (FIG. 6).

Returning to FIG. 2, various information required for computing a paint spray trajectory is input in boxes 34 and 36. In box 34, a paint spray gun is located relative to a desired portion or target of the CAD model. Such placement can be accomplished using a screen GUI but also can be placed by using dials 116, 118, 120, for the X, Y and Z coordinates, respectively, in the main dialogue window 121 (FIG. 7). The spray gun is displayed in the render window 122 near a target portion of the vehicle (FIG. 5). In box 36 of FIG. 2, various paint spray information is specified. Such information is specified through the main dialogue window 121, for example, by typing in the desired droplet diameter to box 126 and by typing the droplet mass density into box 128. In addition, the inclination angle of the paint spray gun, that is the angle of the spray measured from the horizontal, and the base angle, that is the angle of the rotation of the spray about a vertical axis, can be specified by using the sliders 130, 132, respectively, in the dialogue box 121 (FIG.

Figure 2:
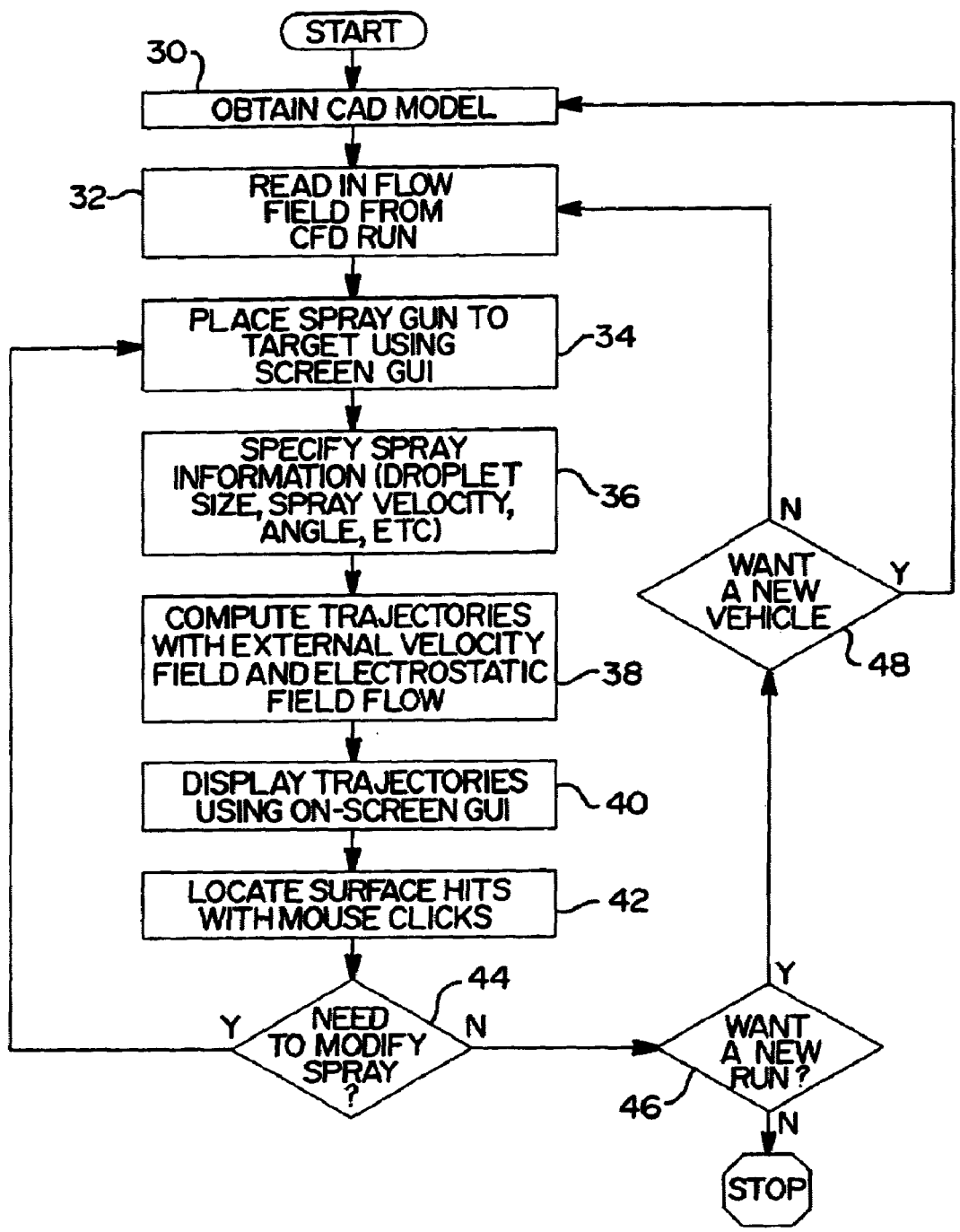
FIG. 2 is a flowchart of a method, according to the present invention, to aid in designing a vehicle using paint spray particle trajectory analysis to determine a paint spray particle trajectory and impact location according to the present invention.
Figure 4:
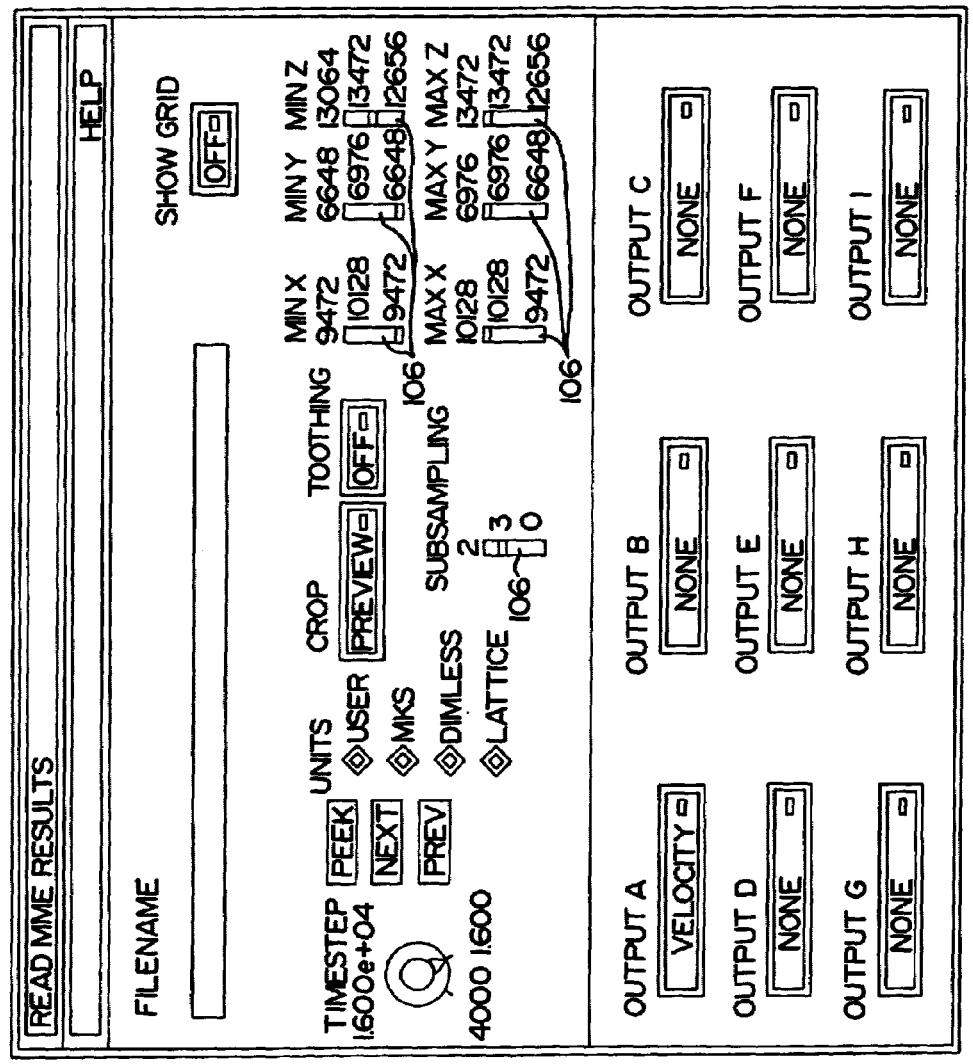
FIG. 4 is a screen view showing cropping and sub-sampling controls for use with the method and system of the present invention.
Figure 7:
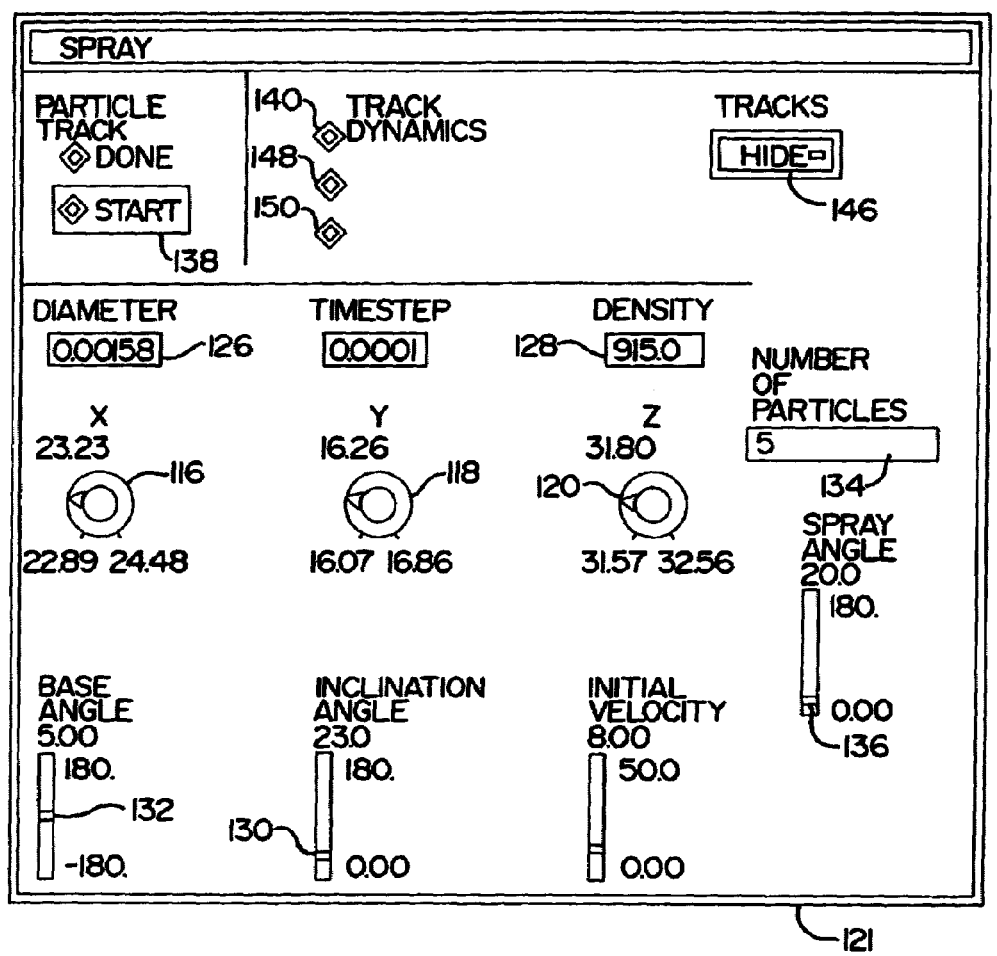
FIG. 7 is a screen view of a dialog window for selecting paint spray gun information to be used in the present invention.
Figure 9A:
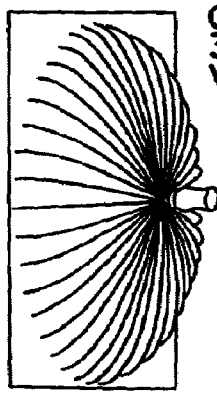
FIG. 9A through 9F are perspective views of paint spray particle trajectories under varying paint spray gun operation and shaping air velocity magnitude.
Figure 9D:
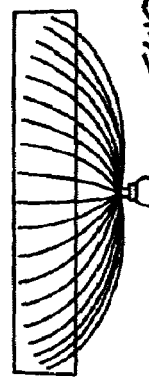
Figure 9B:
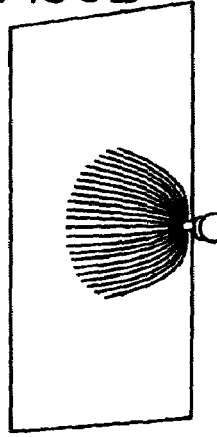
Figure 9E:
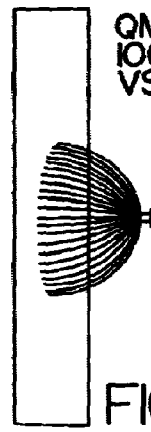
Figure 9C:
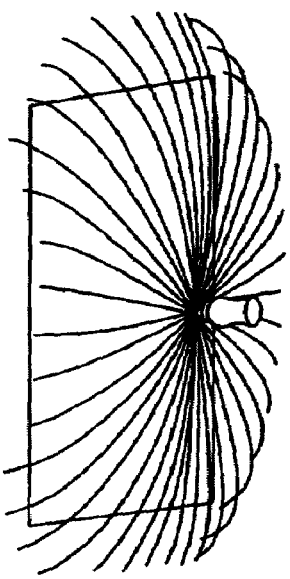
Figure 9F:
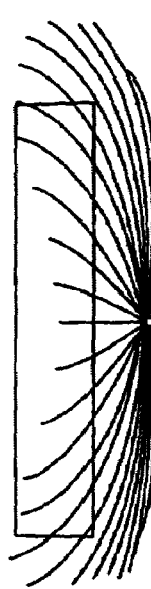

7). The trajectory of a single particle may be examined, as can the trajectories of multiple particles in the form of a spray. The number of particles and the spray angle may be input using box 144 and slider 136, respectively, in the main dialogue window 121. The paint spray gun may be dynamically altered in position, slope and inclination to reflect current user selections and to provide a visual aid for assessing resulting trajectories. After the paint spray gun has been positioned to a user satisfaction, trajectory calculations, with external flow, are performed (box 38, FIG. 2) by pressing a start button 138 in the main dialogue box 121 (FIG. 7). A user may select various trajectories 140, 148 and 150 to be rendered. Flow steam lines which are not affected by droplet size and which correspond to trajectories of massless particles, can also be rendered. These individual tracks can be displayed or hidden through the use of a "show/hide" button 146 in the main dialogue box 121 (FIG. 7).

Returning to FIG. 2, the diamond 44 inquires whether the paint spray gun must be modified, and if so, flow is routed to box 34 where the just described process of box 34 through 42 are repeated with the modified paint spray gun information. If there is not a desire to modify the paint spray gun, then a user may request a new run in diamond 46. If a new run is chosen, the choice is made of picking a new vehicle in diamond 48. If a new vehicle is chosen, flow is routed to box 30 and the process of box 30 through 42 are repeated. However, if a new vehicle is not chosen, the flow is routed to box 32 and the processes in boxes 34 through 42 are repeated. It should be appreciated that a new vehicle or information re-specified if a new run is desired. It should also be understood that the quarter of the individual process steps of FIG. 2 may be altered, and that some of the steps may be individually altered or deleted without departing from the invention.

A representative computer system for the paint spray particle trajectory analysis method and system, according to the present invention, is depicted in FIG. 10. The system includes a processing unit 150 connected to a user interface which may include a display terminal 152, a keyboard 154, a pointing device, such as a mouse, 156, and the like. The processing unit 150 preferably includes a central processing unit, a memory, and stored instructions, which implement a method to assist in vehicle design according to the present invention. The stored instructions may be stored within the processing unit 150 in the memory, or in any non-volatile storage such as magnetic or optical media, EPROM, EEPROM, or the like. Alternatively, instructions may be loaded from removal magnetic media 160, such as a removal disk, sometimes called a floppy disk, optical media 158, or the like. In a preferred embodiment, the system includes a general purpose computer program to implement the functions illustrated and described with reference to FIGS. 1 through 9F. Of course, a system according to the present invention could also be embodied with a dedicated device, which includes various combinations of hardware and software. The preferred embodiment may also include a printer 162 connected to the processing unit 150, as well as a network connection for accessing a local server, an intranet 164, and the Internet 166.

In a preferred embodiment, the present invention includes an arithmetic logic circuit configured to retrieve information from a specific file, display that information in a form of a vehicle design on a display screen, compute particle trajectories relative to the vehicle design based on specific input, display the trajectories relative to the vehicle design, and allow the user to modify the specific input in order to produce trajectories which meet the design criteria.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for designing a vehicle by enabling dynamic placement of paint spray particles into a flow domain to permit visual observation and alteration of resulting particle trajectories under a computed flow solution over a computer aided design (CAD) model representative of a desired portion of the vehicle represented on a display by a computer having memory, a processor and a user input mechanism associated therewith, said system comprising:

spray gun placement code means operable with the user input mechanism to dynamically effect a desired placement of at least one paint spray gun on the display with respect to the desired portion of the CAD model;

trajectory determination code means for computing at least one trajectory for a particle stream emanating from the at least one paint spray gun relative to the desired portion of the CAD model for a predetermined set of particle characteristics in a predetermined set of particle external conditions; and trajectory display code means for effecting display of the at least one trajectory with respect to the desired portion of the CAD model.

2. A system as set forth in claim 1 wherein the spray gun placement code means includes GUI means for displaying a spray gun GUI on the display, the GUI means operative with the input mechanism for locating the desired placement of the at least one paint spray gun.

3. A system as set forth in claim 1 wherein the predetermined set of particle characteristics includes at least one of a set of particle diameter data, particle density data, and particle initial velocity data.

4. A system as set forth in claim 1 wherein the trajectory display code means includes code means for displaying coordinate information of the display relative to the CAD model for intersection of the at least one trajectory with the desired portion of the vehicle.

5. A method for designing a vehicle using particle trajectory analysis with a computer aided design (CAD) model representative of the vehicle, said method comprising the steps of:

preparing a CAD model of a desired portion of the vehicle;

placing a paint spray gun at a desired location with respect to the desired portion of the vehicle;

specifying a set of particle information describing particles to be sprayed from the paint spray gun;

computing a trajectory for a particle stream emanating from the paint spray gun;

displaying the trajectory relative to the desired portion of the vehicle on a display to permit visual observation thereof; and repositioning the paint spray gun if necessary to achieve a desired trajectory.

6. A method for designing a motor vehicle by enabling dynamic placement of paint spray particles into a flow domain to permit visual observation and alteration of resulting particle trajectories with respect to a computer aided design (CAD) model representative of the vehicle, said method comprising the steps of:

storing a first set of data representing a CAD model of a desired portion of the vehicle into a computer memory;

displaying the first set of data on a video display screen;

placing at least one paint spray gun at a desired location with respect to the desired portion of the vehicle by storing a second set of data representing the at least one paint spray gun in the computer memory;

storing a third set of data in the computer memory representing particle information describing particles to be sprayed from the paint spray gun;

computing a fourth set of data representing a trajectory for a particle stream emanating from the paint spray gun using the first, second and third sets of data;

displaying the fourth set of data representing a trajectory relative to the first set of data representing a desired portion of the vehicle on the video display screen to permit visual observation thereof; and dynamically repositioning the paint spray gun if necessary to achieve a desired trajectory by manipulating the second set of data in the computer memory.

* * * * *